US012413918B2

(12) United States Patent
Rasmussen

(10) Patent No.: US 12,413,918 B2
(45) Date of Patent: Sep. 9, 2025

(54) HEARING DEVICE WITH DECOUPLER

(71) Applicant: GN Hearing A/S, Ballerup (DK)

(72) Inventor: Benny Bøgvad Rasmussen, Frederiksberg (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 17/191,687

(22) Filed: Mar. 3, 2021

(65) Prior Publication Data

US 2021/0306778 A1 Sep. 30, 2021

(30) Foreign Application Priority Data

Mar. 28, 2020 (EP) .................................... 20166530

(51) Int. Cl.
*H04R 25/00* (2006.01)

(52) U.S. Cl.
CPC ........... *H04R 25/607* (2019.05); *H04R 25/50* (2013.01)

(58) Field of Classification Search
CPC .... H04R 25/505; H04R 25/70; H04R 25/554; H04R 25/356; H04R 25/60; H04R 25/65; H04R 25/604; H04R 25/652; H04R 25/43; H04R 25/558; H04R 25/607; H04R 25/50; H04R 2225/41; H04R 2225/61; H04R 2225/63; H04R 2225/021; H04R 2225/51
USPC ........................................ 381/330, 331, 324
See application file for complete search history.

(56) References Cited

U.S. PATENT DOCUMENTS

2007/0014423 A1* 1/2007 Darbut .................. H04R 25/65 381/330
2009/0169038 A1 7/2009 Knudsen et al.
2009/0196444 A1* 8/2009 Solum .................... H01Q 1/273 381/315

(Continued)

FOREIGN PATENT DOCUMENTS

CN 101155216 4/2008
CN 106878901 6/2017

(Continued)

OTHER PUBLICATIONS

European Search Report dated Nov. 12, 2020 for EP Appln. No. 20166530.4.

(Continued)

*Primary Examiner* — Ahmad F. Matar
*Assistant Examiner* — Sabrina Diaz
(74) *Attorney, Agent, or Firm* — Vista IP Law Group, LLP

(57) ABSTRACT

A hearing device comprising a behind-the-ear module and a tube element extending from the behind-the-ear module is disclosed. The behind-the-ear module comprises a signal processor for processing received audio signals into a signal modified to compensate for a user's hearing impairment, and an antenna configured for emission and reception of electromagnetic radiation at a first frequency. The hearing device further comprises at least one electrically conducting element, wherein a first section of the at least one electrically conducting element extends into the tube element, and at least one decoupling element, the at least one decoupling element being configured to electrically decouple the first section and the behind-the-ear module at the first frequency while maintaining an electrical connection between the first (Continued)

Figure 1A:
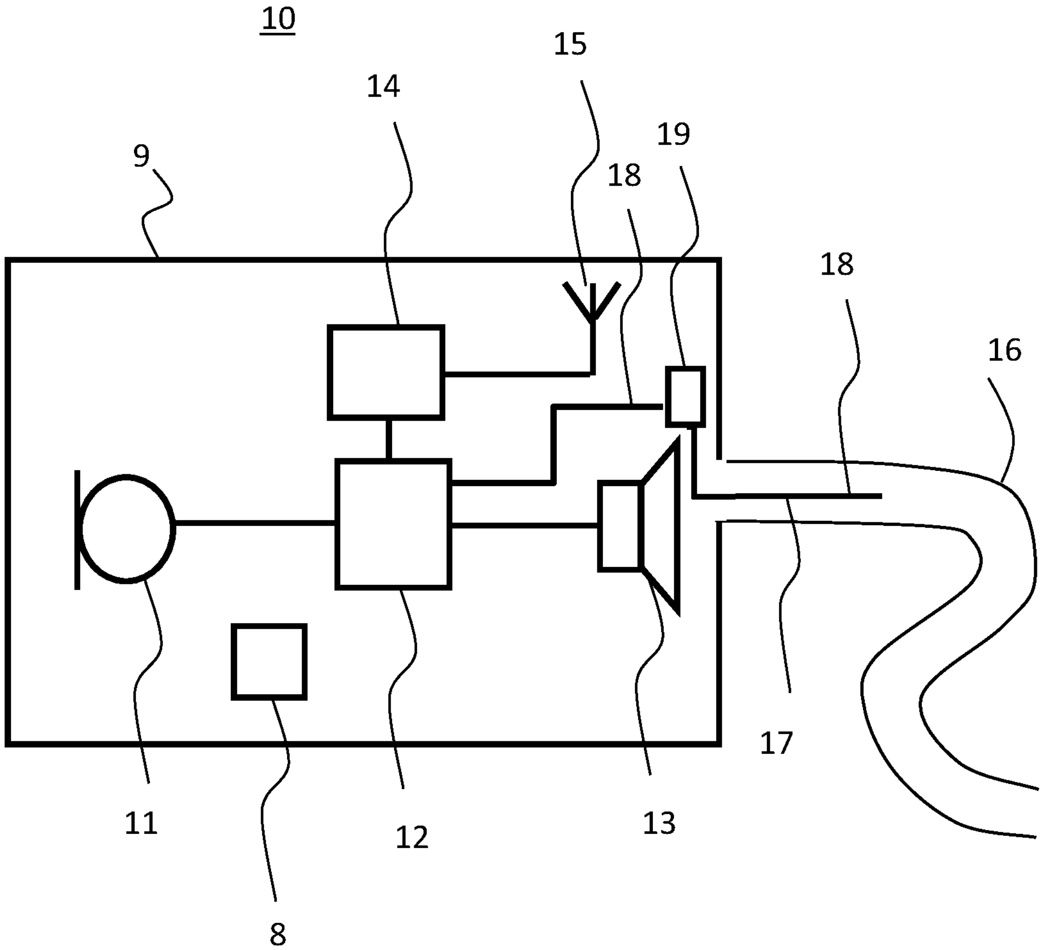

section and the behind-the-ear module at second frequencies.

28 Claims, 9 Drawing Sheets

(56) References Cited

U.S. PATENT DOCUMENTS

| | | | | |
|---|---|---|---|---|
| 2013/0223664 | A1 | 8/2013 | Meskens et al. | |
| 2014/0328507 | A1* | 11/2014 | Rabel | H04R 25/554 381/315 |
| 2015/0043763 | A1* | 2/2015 | Troelsen | H04R 25/554 343/718 |
| 2017/0188163 | A1* | 6/2017 | Rabel | H04R 25/55 |

FOREIGN PATENT DOCUMENTS

| | | | | |
|---|---|---|---|---|
| WO | WO 2015/127973 | | 9/2015 | |
| WO | WO-2015127973 | A1 * | 9/2015 | H04R 25/554 |

OTHER PUBLICATIONS

Foreign Exam Report for EP Patent Appln. No. 20166530.4 dated Aug. 21, 2023.

Foreign Office action dated Apr. 4, 2025 for Chinese patent application No. 202110318412.

English Translation for Foreign Office action dated Apr. 4, 2025 for Chinese patent application No. 202110318412.

* cited by examiner

HEARING DEVICE WITH DECOUPLER

RELATED APPLICATION DATA

This application claims priority to, and the benefit of, European Patent Application No. EP 20166530.4 filed on Mar. 28, 2020. The entire disclosure of the above application is expressly incorporated by reference herein.

FIELD

The present disclosure relates to hearing devices and methods therefore, particularly hearing devices having wireless communication capabilities and thus hearing devices comprising antennas for communication.

The present disclosure further relates to a hearing device configured to communicate using magnetic induction and/or to communicate through the use of radio frequencies.

The hearing device may be used in a binaural hearing device system. The hearing device may be hearing devices for compensating a hearing loss of a user. During operation, the hearing device is worn in or at the ear of a user, such as for alleviating a hearing loss of the user.

BACKGROUND

Hearing devices are very small and delicate devices and comprise many electronic and metallic components contained in a housing or shell small enough to fit in the ear canal of a human or be located behind the outer ear. The many electronic and metallic components in combination with the small size of the hearing device housing or shell impose high design constraints on antennas to be used in hearing devices with wireless communication capabilities, both MI antennas and RF antennas.

Moreover, particularly antennas in hearing devices must be designed to achieve a satisfactory performance despite these limitations and other narrow design constraints imposed by the size of the hearing device and the proximity to a user's head.

The developments within wireless technologies in general have led to even higher expectations of the communication capabilities of the hearing devices, despite a concurrent continuous efforts to make hearing devices smaller and more cost effective to manufacture.

Still further, in binaural hearing device systems, the requirements to the quality of the communication between the hearing devices in the binaural hearing device system are ever increasing, and so is the requirements for communication between the hearing device and other electronic devices, such as smart phones, accessory devices, etc., and include demands for low latency, higher bandwidth, and low noise, increasing the requests for effective antennas in the hearing devices.

Therefore, there is a need for an improved design of hearing devices providing communication with other hearing devices or electronic devices.

SUMMARY

In accordance with the present disclosure, one or more of the above-mentioned and other objects are obtained by the disclosed hearing device.

In accordance with one aspect of the disclosure, a hearing device is provided, the hearing device comprising a behind-the-ear module and a tube element extending from the behind-the-ear module, wherein the behind-the-ear module comprises a signal processor for processing received audio signals into a signal modified to compensate for a user's hearing impairment and an antenna configured for emission and reception of electromagnetic radiation at a first frequency. The hearing device further comprises at least one electrically conducting element, wherein a first section of the at least one electrically conducting element extends into the tube element, and at least one decoupling element, the at least one decoupling element being configured to electrically decouple the first section and the behind-the-ear module at the first frequency while maintaining an electrical connection between the first section and the behind-the-ear module at second frequencies.

The hearing device typically comprises a first transducer, such as a microphone to generate one or more microphone output signals based on a received audio signal. The one or more microphone output signals are provided to the signal processor for processing the one or more microphone output signals. A receiver or speaker is connected to an output of the signal processor, for example for converting the output of the signal processor into a signal modified to compensate for a user's hearing impairment, and provides the modified signal to the speaker.

The signal processor may comprise elements such as processing elements, an amplifier, a compressor and/or a noise reduction system etc. The signal processor device may further have a filter function, such as compensation filter for optimizing the output signal.

In some embodiments, the at least one decoupling element is provided between the signal processor and the first section of the electrically conductive element. In some embodiments, the at least one decoupling element is provided in the signal path between the signal processor and the electrically conductive element extending into the tube element. In some embodiments, the at least one decoupling element is provided between the wireless communication unit and the first section of the at least one electrically conductive element, such as between the wireless communication unit and any electrically conductive element extending into the tube element. The at least one decoupling element may be provided in the signal path between the wireless communication unit and the at least one electrically conductive element extending into the tube element, such as between the wireless communication unit and any electrically conductive element extending into the tube element.

In some embodiments, the decoupling element is configured to reduce or block signal content at or about the first frequency, so that any coupling with the antenna is eliminated.

It is an advantage of providing at least one decoupling element being configured to electrically decouple the first section and the behind-the-ear module at the first frequency while maintaining an electrical connection between the first section and the behind-the-ear module at second frequencies, in that it is hereby ensured that the first section of the electrically conducting element does not act as an antenna, and/or does not interfere with the antenna functionality at the first frequency. Typically, a first section of an electrically conducting element extending into a tube element, such as a first section of an electrically conducing element interconnecting components of a behind-the-ear module and electrical components of an ear element of the hearing device, is a long wire. Such a long wire could, if not decoupled at the first frequency, interfere with the antenna functionality of the antenna in the hearing device, either by electromagnetic interference, by artificially extending the length of the antenna in the hearing device, by coupling between the antenna in the hearing device and the electrically conducting element, etc., which would influence the antenna functionality improperly. Particularly, as the length of the tube element varies for various head configurations, the length of the electrically conducting elements, such as wires, are not known, and thereby, any influence of the electrically conducting elements is not known, and will give an unspecified disturbance.

By means of the decoupling element, the at least one electrically conducting element extending into the tube element is configured to be decoupled from the components of the behind-the-ear module at the first frequency. Hereby, any antenna functionality of the electrically conducting element at the first frequency is suppressed.

The hearing device comprises an antenna. The antenna may be any antenna configured for emission and reception of electromagnetic radiation at the first frequency. The antenna may be interconnected with a wireless communication unit. The wireless communication unit is configured for wireless communication, including wireless data communication, and is in this respect interconnected with the antenna for emission and reception of an electromagnetic field. The wireless communication unit may be configured for interconnecting the signal processor with the antenna for providing wireless communication with other hearing devices and/or other external electronic devices. The hearing device may be configured for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The wireless communication unit may comprise a transmitter, a receiver, a transmitter-receiver pair, such as a transceiver, and/or a radio unit. The wireless communication unit may be configured for communication using any protocol as known for a person skilled in the art, including Bluetooth, including Bluetooth Low Energy, Bluetooth Smart, etc., WLAN standards, manufacture specific protocols, such as tailored proximity antenna protocols, such as proprietary protocols, such as low-power wireless communication protocols, such as CSR mesh, etc.

The antenna may be a magnetic antenna. The antenna may be an electrical antenna. The antenna may be configured to resonate at the first frequency. In some embodiments, the antenna is a resonant antenna at the first frequency. It is an advantage of operating the antenna at or close to the resonance frequency, such as at the frequency at which the antenna is resonant, as the efficiency of the antenna may be at or proximate a maximum efficiency at the resonant frequency.

The antenna may be configured for operation at radio frequencies, such as at radio frequencies above 800 MHZ, such as above 1 GHZ, such as above 1.5 GHZ, such as at about 1.6 GHZ, such as at about 2.4 GHz. The antenna may be configured for operation at radio frequencies, such as in one or more ISM frequency bands; such as in one or more ISM frequency bands appropriate for communication in a hearing device. In some embodiments, the hearing device may use the 2.45±0.05 GHZ ISM band and/or the 1.6 GHz ISM band.

The antenna may be configured for operation at frequencies in a range from 800 MHZ to 6 GHz. The antenna may be any antenna capable of operating at these frequencies. The antenna may be implemented in any way, and the antenna may be a monopole antenna, a dipole antenna, etc. The antenna may be a loop antenna, such as an open loop antenna. The antenna may be any antenna as known, such as any electrical antenna, and the antenna may be, or may comprise, an elongated conducting material, the elongated conducting material being configured to emit or receive electromagnetic radiation in any known way.

The hearing device further comprises at least one electrically conducting element, wherein a first section of the at least one electrically conducting element extends into the tube element. The at least one electrically conducting element may be a wire, such as a lead wire, such as an electrical wire, a cable, a cord, etc.

In some embodiments, the second frequencies include all frequencies except the first frequency. In some embodiments, the second frequencies include frequencies which are above and/or below the first frequency. In some embodiments, the second frequencies include all frequencies outside a range of frequencies about the first frequency, such as all frequencies outside a range of frequencies being +/−10% of the first frequency, such as all frequencies outside a range of frequencies being +/−5% of the first frequency, such as all frequencies outside a range of frequencies being +/−3% of the first frequency, such as all frequencies outside a range of frequencies being +/−1% of the first frequency.

Having at least one decoupling element configured to electrically decouple the first section of the at least one electrically conducting element and the behind-the-ear module at the first frequency while maintaining an electrical connection between the first section and the behind-the-ear module at second frequencies provides that any electromagnetic coupling at or around the first frequency between electronic components in the behind-the-ear module and the at least one electrically conducting element is reduced. In some embodiments, the at least one electrically conducting element is decoupled at the first frequency so that the at least one electrically conducting element does not interfere or couple with the antenna at the first frequency. In some embodiments, the at least one electrically conducting element is decoupled at the first frequency so that the at least one electrically conducting element does not have an antenna functionality. In some embodiments, the at least one electrically conducting element is decoupled at the first frequency so that the at least one electrically conducting element does not have an antenna functionality at the first frequency.

In some embodiments, the at least one electrically conducting element has a second section, and wherein the at least one decoupling element is provided between the first section and the second section; the at least one decoupling element being configured to electrically decouple the first section from the second section at the first frequency, while maintaining an electrical connection between the first section and the second section at the second frequencies. In some embodiments, the at least one decoupling element is provided in series between the first section and the second section.

In some embodiments, the second section of the at least one electrically conducting element extends at least partly in the behind-the-ear module.

In some embodiments, the at least one electrically conducting element is an electrically conducting element extending from the behind-the-ear module and into the tube element. The decoupling element may be provided between the second section extending in the behind-the-ear module and the first section extending in the tube element.

In some embodiments, the at least one decoupling element has a high impedance at the first frequency, preferably an impedance above 1 kΩ. In some embodiments, the at least one decoupling element has an impedance is above 1 kΩ, such as above 1.5 kΩ, such as above 4 kΩ, such as above 5 kΩ.

In some embodiments, the at least one decoupling element is an inductor having a self-resonant frequency at the first frequency. In some embodiments, the at least one decoupling element is an inductor having a self-resonant frequency being within a range or a bandwidth centered about the first frequency. In some embodiments, the self-resonant frequency of the inductor is within a range of +/−10% of the first frequency, such as within a range of +/−5%, such as within a range of the +/−3% of the first frequency. In some embodiments, the coupling element is an inductor, such as a separate physical component including an inductor, such as an SMD type inductor.

It is an advantage of using an inductor at its resonance frequency in that the decoupling is provided within a narrow range of frequencies about the resonance frequency of the inductor. It is an advantage that the decoupling is performed only at the first frequency, or only within a frequency range about the first frequency, such as within a range of +/−10% of the first frequency, such as within a range of +/−5%, such as within a range of the +/−3% of the first frequency. Hereby, disturbance of any signals transmitted on the at least one electrically conductive element are minimized, as only signals at frequencies within such specified ranges are decoupled.

In some embodiments, the hearing device comprises one or more conducting elements, thus, the at least one conducting element may comprise one, two, three, four, etc, conducting elements, such as wires extending into the tube element. In some embodiments, each of the at least one conducting elements is connected in series with at least one decoupling element. In this way, each conducting element, such as each wire, extending into the tube element is connected to electrical components of the behind-the-ear module through the at least one decoupling element.

In some embodiments, the at least one decoupling element comprises a primary decoupling element and a secondary decoupling element, the primary decoupling element and the secondary decoupling element being connected in series.

The primary decoupling element may be configured to decouple the at least one conducting element from the behind-the-ear module at the first frequency, while the secondary decoupling element may be configured to decouple the at least one conducting element from the behind-the-ear module at another frequency, different from the first frequency while maintaining an electrical connection at second frequencies.

In some embodiments, the at least one decoupling element is provided in the behind-the-ear module.

In some embodiments, the tube element is configured to provide a sound signal to the ear of a user, such sound signal may be provided to the ear of a user either acoustically or electrically.

In some embodiments, the hearing device further comprises an electro-mechanical interface configured to releasably, such as detachably, attach the tube element to the behind-the-ear module. Such releasably attachment may be performed in any way as well-known for a skilled person, such as using male/female connector parts, using snap or click assemblies, etc. It is an advantage of being able to disconnect the tube element from the behind-the-ear module, in that e.g. the tube element may be exchanged, for example due to wear and tear of the tube element, so that the tube element may be fitted to the user, e.g. to obtain a desired size of tube element, etc., the tube element may be replaced to obtain a proper fit, or detached e.g. for cleaning or replacement with limited efforts and with minimised coupling with the behind-the-ear module as such.

In some embodiments, the electro-mechanical interface has a first part forming part of the behind-the-ear module and a second part forming part of the tube element. At least one of the decoupling elements may be provided in the second part of the electro-mechanical interface. The decoupling element provided in the second part of the electro-mechanical interface may be connected in series with the wire/conducting element. At least one of the decoupling elements may be provided in or adjacent the first part forming part of the behind-the-ear module. The decoupling element provided in or adjacent the first part of the electro-mechanical interface may be connected in series with the wire/conducting element.

It is an advantage of providing the at least one coupling element in the electro-mechanical interface, such as either in the first part of the electro-mechanical interface, or in the second part of the electro-mechanical interface, in that the coupling element is then provided as close as possible, such as in proximity or adjacent, to the part of the electrical conducting element extending into the tube element, such as in proximity to the first section of the at least one electrical conducting element. This improves the decoupling between the behind-the-ear module and the wire extending into the tube element, so as to e.g. make the decoupling more efficient.

The first part and the second part of the electro-mechanical interface may be provided as a plug and a socket for receiving the plug, respectively.

In some embodiments, the electrical interconnection at second frequencies are provided through the electro-mechanical interface.

In some embodiments, the hearing device comprises a wireless communication unit being interconnected with the antenna configured for emission and reception of electromagnetic radiation having a first bandwidth centered about the first frequency.

In some embodiments, the wireless communication unit being interconnected with the antenna, or with an additional antenna, is further configured for emission and reception of electromagnetic radiation having a second bandwidth centered about a third frequency. The first and third frequencies may be frequencies suitable for wireless communication, such as suitable for wireless communication in a hearing aid, the first and third frequencies may be selected as frequencies about 2.4 GHZ, about 1.6 GHZ, at about 900 MHZ, etc.

In some embodiments, the first section of the electrically conducting element is not decoupled from the behind-the-ear module at the third frequency. In some embodiments, the first section is configured as an antenna at the third frequency.

In some embodiments, the at least one decoupling element is further configured to electrically decouple the first section and the behind-the-ear module at the third frequency, the third frequency being different from the first frequency and the second frequencies. In some embodiments, a first primary decoupling element provided in series with the first section of the electrically conducting element is configured for decoupling the first section at the first frequency. A first secondary decoupling element may be provided in series with the first section of the electrically conducting element and the first primary decoupling element and being configured for decoupling the first section at the third frequency. The first primary decoupling element may be an inductor having a self-resonant frequency at the first frequency. The first secondary decoupling element may be an inductor having a self-resonant frequency at the third frequency.

In some embodiments, the first frequency is selected in the 2.4 GHz ISM band, and the third frequency is selected in the 1.6 GHz ISM band. It is an advantage that the hearing device may communicate wirelessly with hearing devices or electronic devices at two different frequencies, such as at a first frequency and at a third frequency. It is an advantage that the hearing device may communicate wirelessly with hearing devices or electronic devices using the 2.4 GHz ISM band and/or the 1.6 GHZ ISM band.

In some embodiments, the hearing device comprises a plurality of electrically conducting elements and a plurality of decoupling elements configured to electrically decouple the plurality of electrically conducting elements from the behind-the-ear module at the first frequency and optionally at the third frequency. Each of the plurality of electrically conducting elements is connected in series with one or more of the plurality of decoupling elements.

Thus, each of the decoupling elements may be connected in series with one or more decoupling elements. When connected with two decoupling elements, one of the decoupling elements may be configured to decouple at the first frequency and one of the decoupling elements may be configured to decouple at the third frequency.

In some embodiments, each of the plurality of electrically conductive elements, that is all electrical connections, between the behind-the-ear module and the tube element are electrically decoupled at the first frequency. In some embodiments, each of the plurality of electrically conductive elements, that is all electrical connections, between the behind-the-ear module and the tube element are electrically decoupled at the first frequency, and optionally, also at the third frequency.

In some embodiments, the hearing device further comprises an ear element, the ear element being configured to be positioned in the ear of a user to e.g. receive the modified signal from the signal processor via the tube element, and provide the modified signal to the ear of a user. The ear element may be attached to the tube element. The ear element may be attached to the tube element opposite the behind-the-ear module. The ear element may be any ear element, such as an ear element configured to be provided at least partly in the ear canal, to be provided completely in the canal, the ear element may be a receiver-in-the-ear element (RIE element) etc.

In some embodiments, the ear element comprises an ear-mold with no electrical parts. The ear element may be an ear-mold, such as an ear plug, configured to ensure that sound provided via the tube element reaches the ear canal of a user. In some embodiments, the tube element is configured to provide the modified signal to an ear of a user through a sound tube so that the tube element comprises a sound tube. In some embodiments, the ear element comprises at least one in-ear electrical component, such as at least one transducer; the at least one in-ear electrical component may be electrically connected with electrical components of the behind-the-ear module. The electrical components of the behind-the-ear element may comprise any one or more of the signal processor, the battery, the antenna, the wireless communication unit, etc. The at least one in-ear electrical component may comprise a transducer. The electrical components of the ear element may comprise one or more transducers.

In some embodiments, the at least one electrically conducting element is configured to provide signals between the behind-the-ear module and the ear element. The signals may include audio type signals, such as transducer type signals, such as signals provided from a transducer to e.g. the signal processor or vice versa. The signals may comprise data and/or power signals, such as signals providing data, such as settings; such as power signals, between the behind-the-ear module and the ear element. For example, the modified signal from the signal processor may be provided via the at least one electrically conducting element to an ear of a user. The tube element may comprise the electrically conducting element, such as a wire, a cable, etc., such as at least the first section of the electrically conducting element.

In some embodiments, the ear element may comprise one or more microphones, and one or more electrically conducting elements may be one or more microphone signal lines connecting the one or more microphones provided in the ear element to at least the signal processor in the behind-the-ear module. In some embodiments, the one or more microphones may be powered by the battery in the behind-the-ear module, so that the one or more electrically conducting elements may be one or more power lines for the one or more microphones provided in the ear element.

In some embodiments, the ear element comprises a receiver, the ear element being configured to be inserted into the ear canal of the user, the tube element interconnects the ear element and the behind-the-ear module, and wherein the modified signal is configured to be provided to the receiver, via the electrically conducting element.

In some embodiments, the hearing device comprises at least a first electrically conducting element and a second electrically conducting element, and wherein the first electrically conducting element is connected with a first decoupling element, and the second electrically conducting element is connected with a second decoupling element and wherein the first decoupling element has a lower impedance than the second decoupling element(s) at audible frequencies. For example the impedance of the second decoupling element may be 10% lower than the impedance of the first decoupling element. Hereby, it may be ensured that the impedance for audio signals is as low as possible, while keeping the size of the components as small as possible. Thus, as e.g. second decoupling elements having a lower impedance at audible frequencies tend to be larger in physical size than the first decoupling elements, the second decoupling elements may be used only for audio type signals and not for e.g. power signals or data signals which are less influenced by the impedance of the decoupling elements, to thereby reduce the size of the decoupling components.

In some embodiments, the decoupling element has a low impedance, such as an impedance below 1000, such as below 500, such as below 100, such as below 50, at the second frequencies, such as at audible frequencies, such as at frequencies between 20 Hz and 20 KHz. It is an advantage of keeping the impedance of the decoupling element low, in that signals at audible frequencies, which are low power signals, are not degraded significantly by the presence of the decoupling element in the signal path.

In some embodiments, one or more of the electrically conducting elements may comprise a shielding element, shielding the electrically conducting elements.

In an aspect of an embodiment, a tube element for a hearing device is provided. The tube element comprises an ear element configured to be inserted into the ear of a user, an electrically conducting element extending into the tube element, and a plug element configured for attachment to the behind-the-ear module, a tube section interconnecting the ear element and the plug element, wherein the plug element comprises a decoupling element, the decoupling element being provided in series with the electrically conducting element; the decoupling element being configured to decouple the electrically conducting element from the behind-the-ear module at a first frequency when the plug element is attached to the behind-the-ear module.

In some embodiments, the decoupling element is an inductor with a self-resonant frequency at the first frequency.

It should be noted that the hearing device as such is of a small size so that the behind-the-ear module is able to fit behind the outer ear of a user, and the tube element, coupling the behind-the-ear housing to the in-the-ear module is of a small size, and configured to be as imperceptible as possible, to ensure that the overall impression of the hearing device maintains a small size to be as un-noticeable to the user as possible.

In some embodiments, the conducting element, such as the electrical interconnection, may be insulated; however, typically, such insulation, to be sufficient for efficiently shielding any electromagnetic noise, would increase the diameter of the electrical interconnection more than desired for a hearing device use.

The present disclosure relates to different aspects including the hearing device and the tube element described above and in the following, and corresponding hearing devices, binaural hearing devices, tube elements, systems, methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims. Any embodiments described in connection with the first aspect of hearing devices, apply equally to any further aspects, mutatis mutandis.

It is also to be understood that the terminology used herein is for purpose of describing particular embodiments only, and is not intended to be limiting. It should be noted that, as used in the specification and the appended claim, the articles “a”, “an”, and “the” are intended to mean that there are one or more of the elements unless the context explicitly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

Figure 1B:
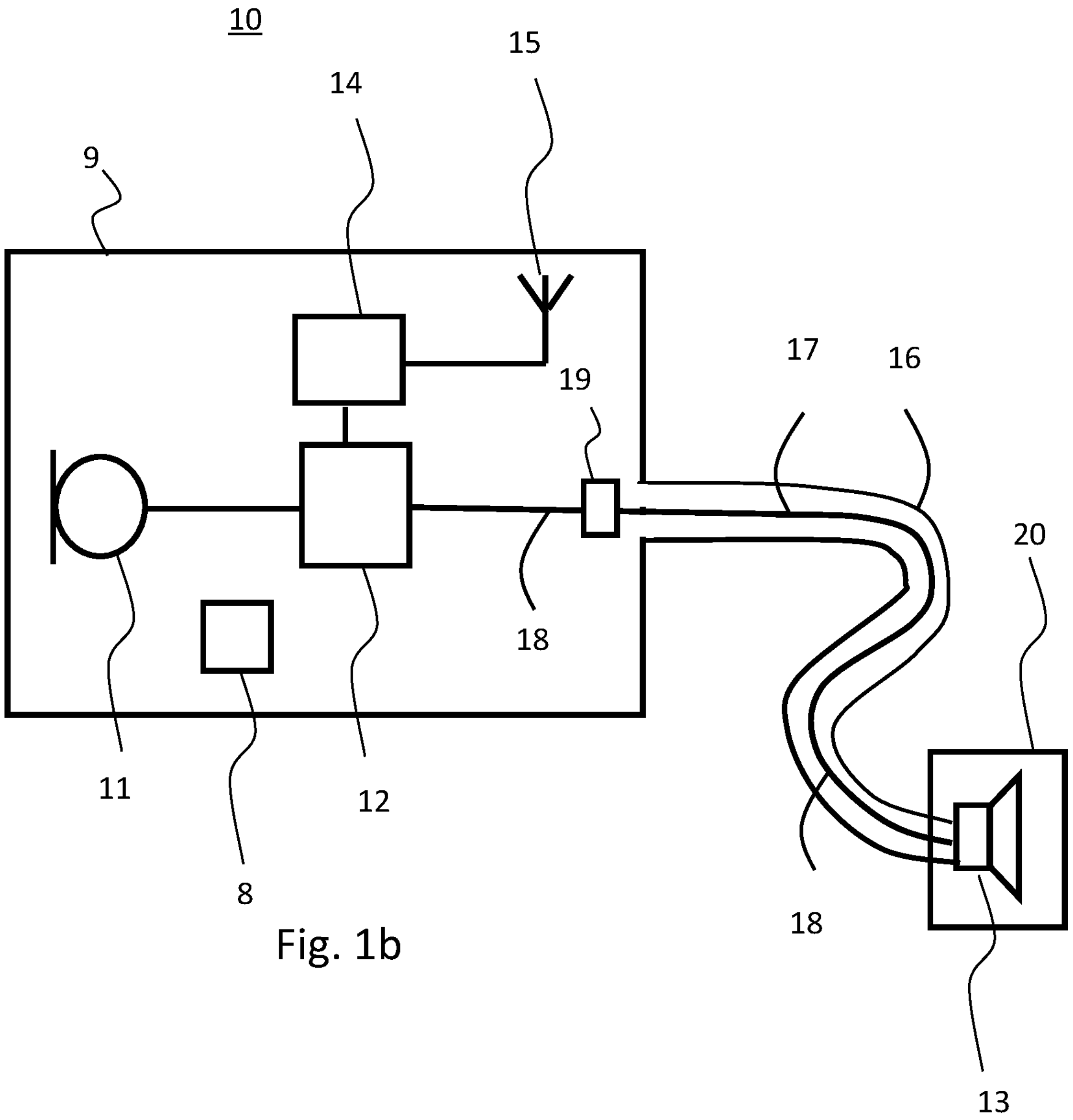
Figure 2A:
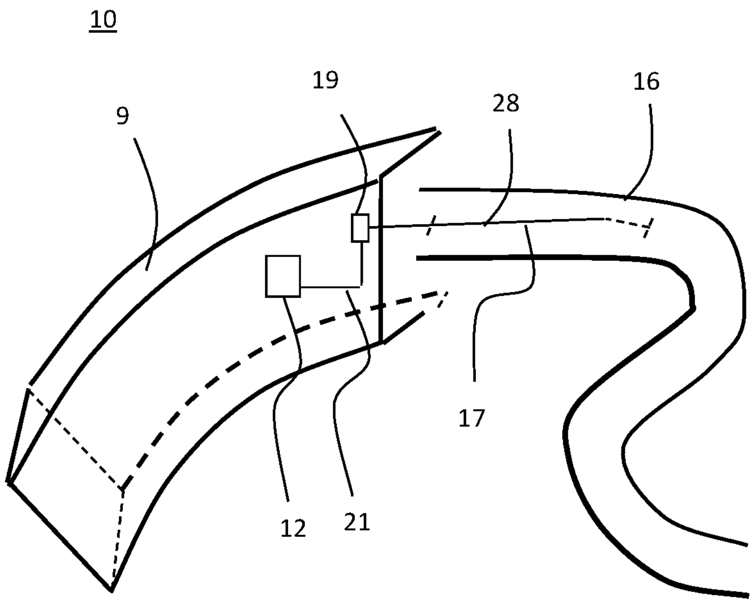
Figure 2B:
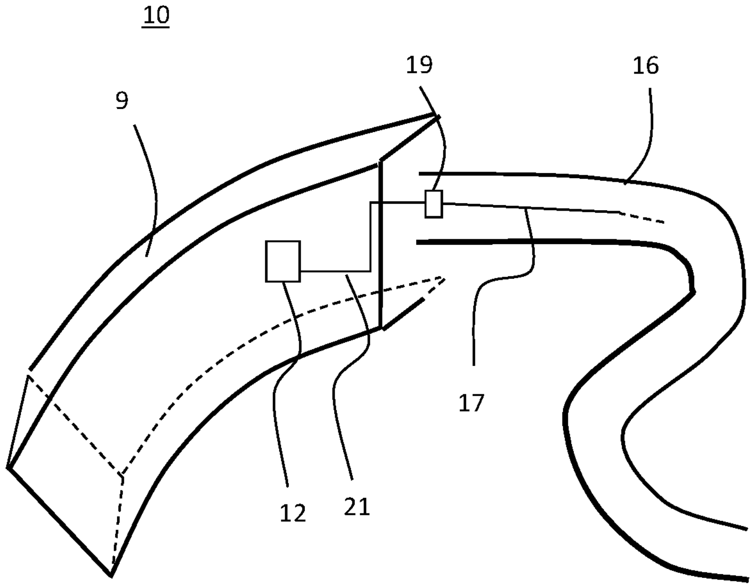
Figure 3:
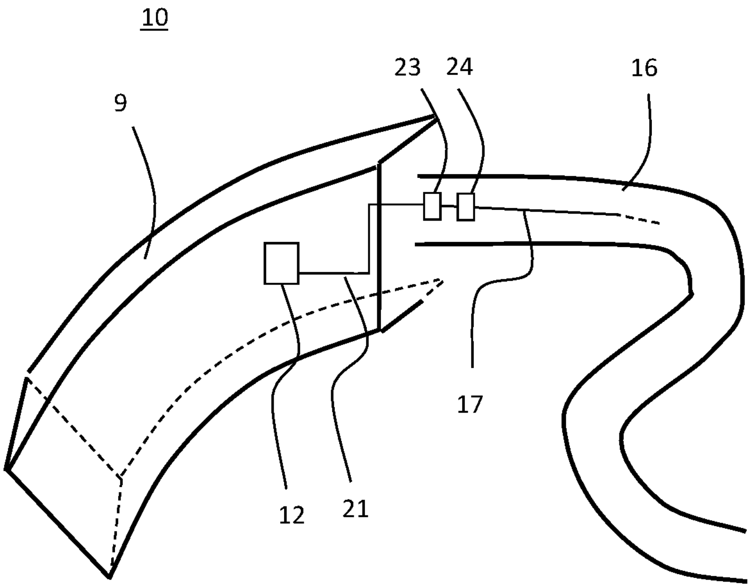
Figure 4A:
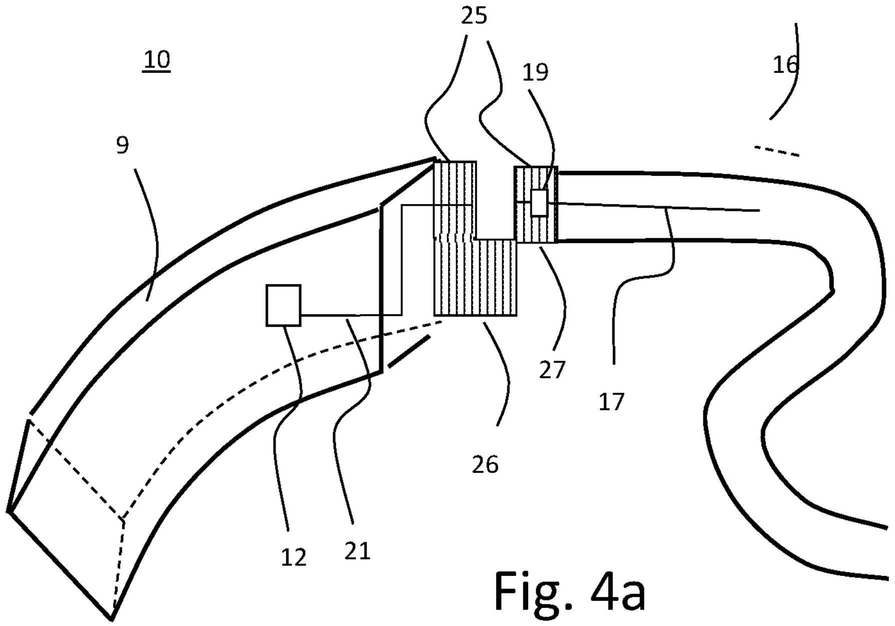
Figure 4B:
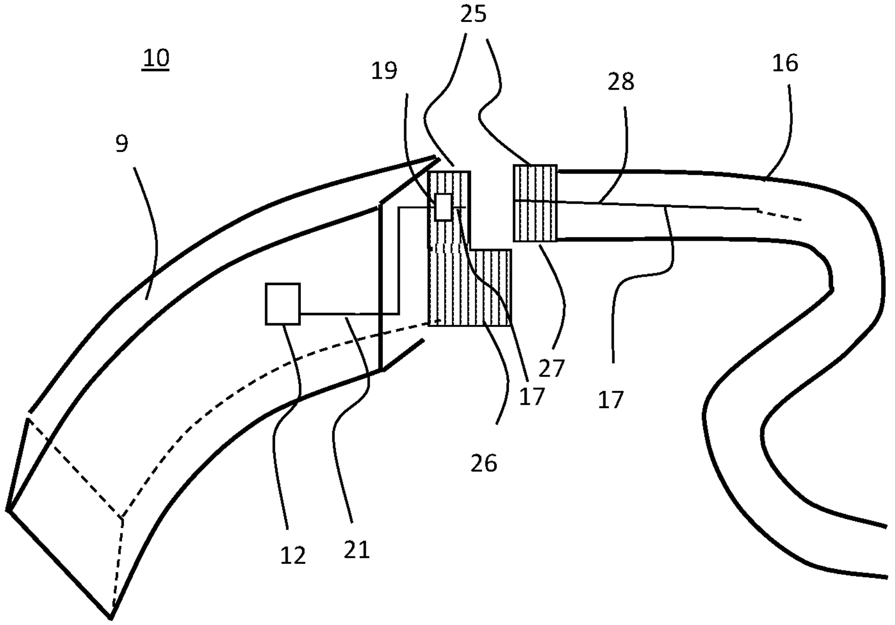
Figure 4C:
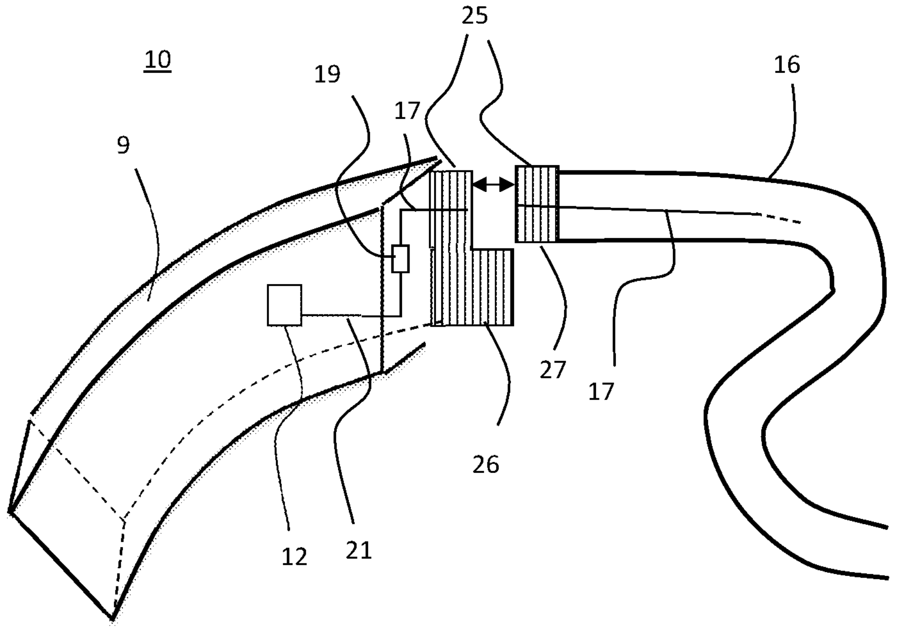
Figure 4D:
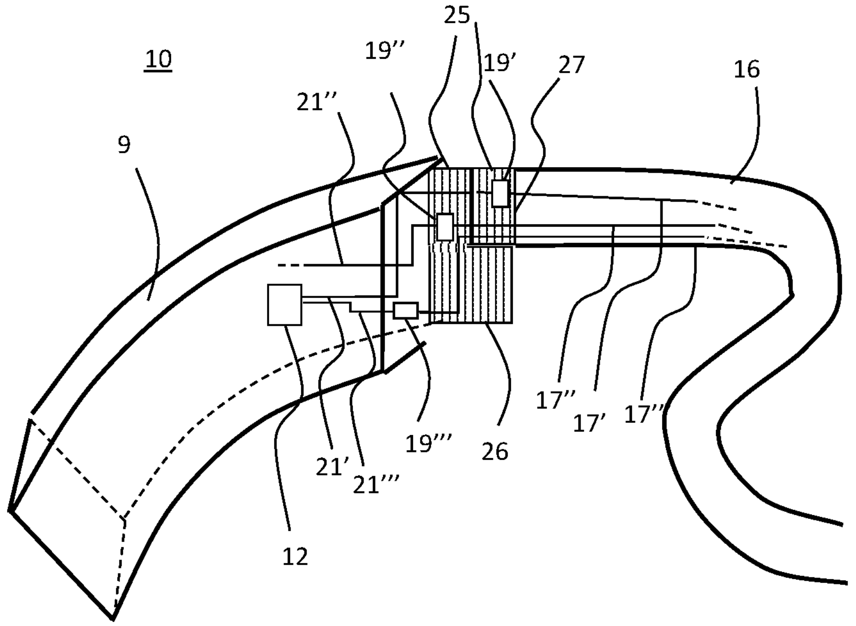
Figure 5:
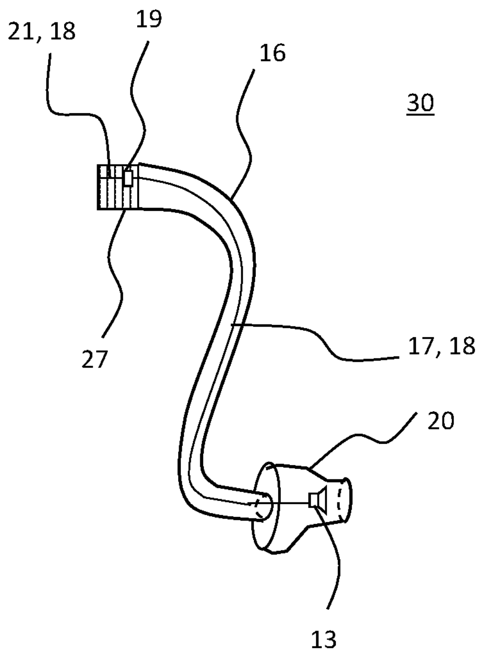
Figure 6:
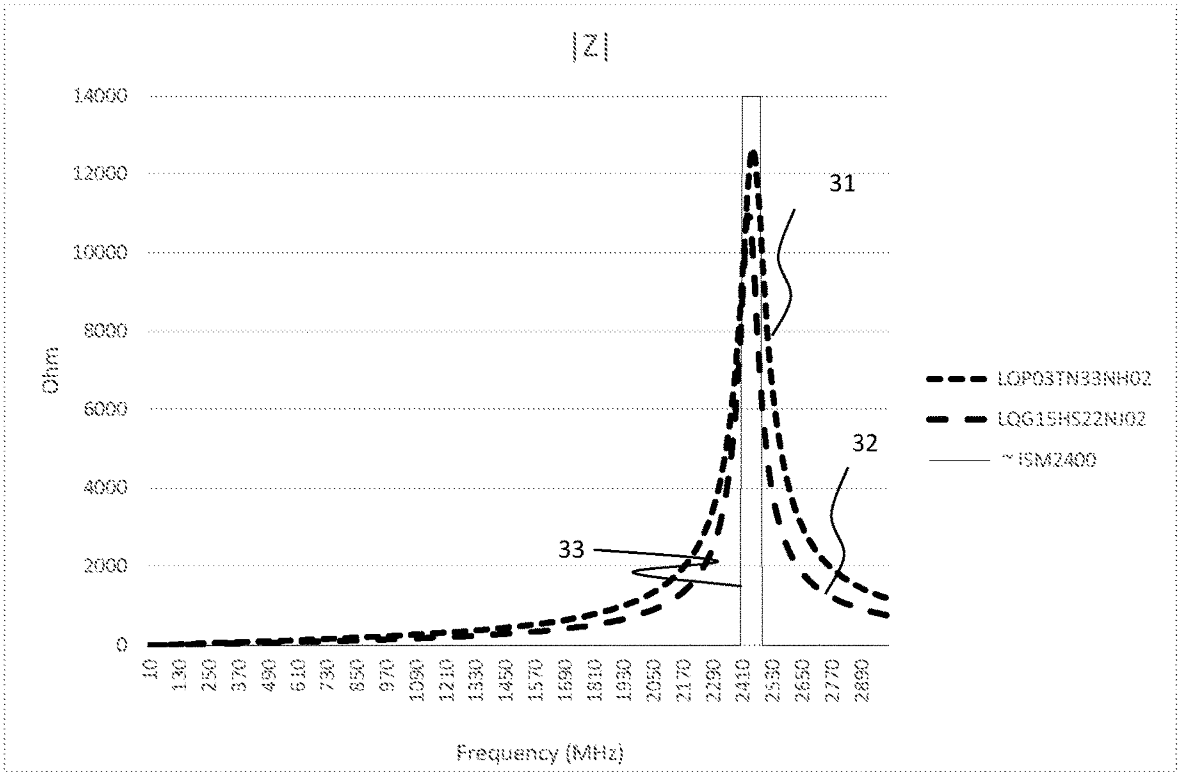

The above and other features and advantages will become readily apparent to those skilled in the art by the following detailed description of exemplary embodiments thereof with reference to the attached drawings, in which:

FIGS. 1*a* and 1*b* schematically illustrate an example of components in a hearing device, FIGS. 2*a* and 2*b* schematically illustrate an example hearing device according to the present disclosure, FIG. 3 schematically illustrates an example hearing device according to the present disclosure, having two decoupling elements in series, FIGS. 4*a*-4*d* schematically illustrate an example hearing device according to the present disclosure, with a plug and socket arrangement between the behind-the-ear module and the tube element, FIG. 5 schematically illustrates an example of a tube assembly according to the present disclosure, FIG. 6 is a graph showing the impedance of an inductor at the self resonant frequency.

DETAILED DESCRIPTION

The present disclosure will become apparent from the detailed description given below. The detailed description and specific examples disclose preferred embodiments by way of illustration only. Those skilled in the art understand from guidance in the detailed description that changes and modifications may be made within the scope of the claimed invention. The detailed description and specific examples disclose preferred embodiments by way of illustration only. Those skilled in the art understand from guidance in the detailed description that changes and modifications may be made within the scope of the claimed invention. Thus, the claimed invention may be embodied in other forms and should not be construed as limited to the herein disclosed embodiments. The disclosed embodiments are provided to fully convey the scope of the claimed invention to the skilled person.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

A block-diagram of an embodiment of a hearing device 10 is shown in FIG. 1*a*. The hearing device 10 comprises a behind-the-ear module 9 and a tube element 16 extending from the behind-the-ear module 9. The behind-the-ear module comprises a signal processor 12 for processing received audio signals into a signal modified to compensate for a user’s hearing impairment, an antenna 15 configured for emission and reception of electromagnetic radiation at a first frequency. The hearing device 10 further comprises at least one electrically conducting element 18, wherein a first section 17 of the at least one electrically conducting element extends into the tube element 16. The hearing device further comprises at least one decoupling element 19. The at least one decoupling element 19 being configured to electrically decouple the first section 17 and the behind-the-ear module 9 at the first frequency while maintaining an electrical connection between the first section 17 and the behind-the-ear module 9 at second frequencies. The at least one decoupling element 19 may thus be configured to electrically decouple the first section 17 and electrical components of the behind-the-ear module 9 at the first frequency while maintaining an electrical connection between the first section 17 and electrical components of the behind-the-ear module 9 at second frequencies. The electrical components of the behind-the-ear module 9 may comprise the signal processor 12, the wireless communication unit 14, the antenna 15, the microphone 11, the battery 8, etc.

The hearing device 10 comprises a behind-the-ear module 9 comprising a first transducer, i.e. microphone 11, to generate one or more microphone output signals based on a received an audio signal. The one or more microphone output signals are provided to a signal processor 12 for processing the one or more microphone output signals. A receiver or speaker 13 is connected to an output of the signal processor 12 for converting the output of the signal processor into a signal modified to compensate for a user's hearing impairment, and provides the modified signal to the speaker 13. The speaker output is provided to the ear of a user via a tube element 16, such as a sound tube.

The hearing device signal processor 12 may comprise elements such as an amplifier, a compressor and/or a noise reduction system etc. The hearing device may further have a filter function, such as compensation filter for optimizing the output signal.

The hearing device 10, and more particularly the behind-the-ear module 9, further comprises a wireless communication unit 14 interconnected with antenna 15. The wireless communication unit 14 and the antenna 15 may be configured for wireless data communication using emission and reception of electromagnetic fields. A wireless communication unit may be implemented as transceiver 14. The hearing device 10 further comprises a power source 8, such as a battery or a rechargeable battery. The battery 8 may supply power to any one or more of the signal processor 12, the receiver, the one or more microphones 11, the wireless communication unit 14, etc. (connections not shown). The antenna 16 is configured for communication with another electronic device, in some embodiments configured for communication with another hearing device, such as another hearing device located at another ear, typically in a binaural hearing device system.

In FIG. 1*b* another block-diagram of an embodiment of a hearing device 10 is shown. A block-diagram of an embodiment of a hearing device 10 is shown in FIG. 1*a*. The hearing device 10 comprises a behind-the-ear module 9 and a tube element 16 extending from the behind-the-ear module 9. The behind-the-ear module comprises a signal processor 12 for processing received audio signals into a signal modified to compensate for a user's hearing impairment, an antenna 15 configured for emission and reception of electromagnetic radiation at a first frequency. The hearing device 10 further comprises at least one electrically conducting element 18, wherein a first section 17 of the at least one electrically conducting element extends into the tube element 16. The hearing device further comprises at least one decoupling element 19. The at least one decoupling element 19 being configured to electrically decouple the first section 17 and the behind-the-ear module 9 at the first frequency while maintaining an electrical connection between the first section 17 and the behind-the-ear module 9 at second frequencies. In FIG. 1*b*, the receiver 13 is provided in an ear element 20, and the at least one decoupling element 19 may thus be configured to electrically decouple the first section 17 of the electrically conducting element and electrical components of the behind-the-ear module 9, such as the signal processor 12, and/or the wireless communication unit 14, at the first frequency while maintaining an electrical connection between the first section 17 and electrical components of the behind-the-ear module 9, such as the signal processor 12 at second frequencies.

The receiver or speaker 13 is provided in ear element 20 configured to be positioned in or at the ear of a user, such as at least partly in the ear canal, such as completely in the ear canal. The receiver 13 is connected to the output of the signal processor 12 for converting the output of the signal processor into a signal modified to compensate for a user's hearing impairment, and provides the modified signal to the speaker 13. The speaker output is provided to the ear of a user via a tube element 16, via electrically conducting element 18. As is seen, the hearing device thus further comprises ear element 20, the ear element 20 being configured to be inserted into the ear canal of the user, the tube element 16 interconnecting the ear element 20 and the behind-the-ear module 9, and wherein the ear element 20 comprises at least one in-ear electrical component 13. This may include a receiver, and the modified signal may be configured to be provided to the receiver, via the at least one electrically conducting element 17.

FIG. 2*a* shows schematically a hearing device 10. The at least one electrically conducting element 18 comprises the first section 17 and the second section 21 is seen as extending from the signal processor 12 and into the tube element 16. It is envisaged that the at least one electrically conducting element could be extending from any of the electrical components in the behind-the-ear modules and that the signal processor is used for illustration purposes. In FIG. 2*a*, the at least one electrically conducting element has a second section 21, and the at least one decoupling element 19 is provided between the first section 17 and the second section 21; the at least one decoupling element 19 being configured to electrically decouple the first section 17 from the second section 21 at the first frequency, while maintaining an electrical connection between the first section 17 and the second section 21 at the second frequencies. As is seen from FIG. 2*a*, the decoupling element 19 is positioned in the behind-the-ear module 9 and the second section 21 of the at least one electrically conducting element extends at least partly in the behind-the-ear module 9. Preferably, the at least one decoupling element 19 is provided adjacent the tube element 16, or in close proximity to the tube element 16. In some examples, this may provide that the decoupling is provided close to the part 28 of the electrically conducting element extending into the tube element 16.

FIG. 2*b* shows schematically a hearing device 10 corresponding to the hearing device 10 of FIG. 2*a*. As is seen from FIG. 2*b*, the decoupling element 19 is positioned in the tube element 16 and the second section 21 of the at least one electrically conducting element extends at least partly in the behind-the-ear module 9; and partly in the tube element 16.

The at least one decoupling element has a high impedance at the first frequency, preferably an impedance above 1 kΩ, such as above 4 kΩ, such as above 5 kΩ. The at least one decoupling element may be an inductor having a self-resonant frequency at the first frequency.

FIG. 3 shows an embodiment in which the at least one decoupling element is further configured to electrically decouple the first section and the behind-the-ear module at a third frequency, the third frequency being different from the first frequency and the second frequencies. In FIG. 3, the at least one decoupling element comprises a primary decoupling element 23 and a secondary decoupling element 24. The primary decoupling element 23 and the secondary decoupling element 24 are being connected in series. The primary decoupling element may be configured to decouple the at least one conducting element from the behind-the-ear module at the first frequency, while the secondary decoupling element may be configured to decouple the at least one conducting element from the behind-the-ear module at another frequency, such as at a third frequency different from the first frequency while maintaining an electrical connection at second frequencies.

The primary decoupling element 23 may have a self resonant frequency at the first frequency, such as about the first frequency, as discussed above, and the secondary decoupling element 24 may have a self resonant frequency at the other frequency, such as at the third frequency different from the first frequency. Hereby, any signals at the first frequency and the third frequency are blocked or at least significantly attenuated while maintaining an electrical connection at any other frequencies, i.e. at second frequencies.

FIGS. 4*a-d* show embodiments of a hearing device 10 further comprising an electro-mechanical interface 25 configured to releasably attach the tube element 16 to the behind-the-ear module 9.

The electro-mechanical interface 25 has a first part 26 forming part of the behind-the-ear module 9 and a second part 27 forming part of the tube element 16. The first part 26 and the second part 27 are configured to be releasably connected in any known way and comprises electrical contacts so that when connected, an electrical connection is provided between first section 17 and second section 21 of each electrically conducting element 18. The first part 26 may be implemented as a socket for receiving the second part 27, which may be implemented as a plug. The first part 26 may form an integrated part of the behind-the-ear module 9. The second part 27 may form an integrated part of the tube element 16.

In FIG. 4*a*, the at least one decoupling element 19 is provided in the second part 27 of the electro-mechanical interface 25. When the first part 26 and the second part 27 are connected, an electrical connection between the first section 17 and the second section 21 is formed, while the decoupling element 19 is configured to decouple the first section 17 and the second section 21 at the first frequency, such as configured to decouple the first section 17 and the behind-the-ear module 9, such as the first section 17 and electrical components, illustrated by signal processor 12, of the behind-the-ear module 9 at the first frequency. Hereby, any coupling at the first frequency between the first section 17 and the behind-the-ear module 9 is at least reduced.

In FIG. 4*b*, the at least one decoupling element 19 is provided in the first part 26 of the electro-mechanical interface 25.

Providing the at least one decoupling element 19 in the electro-mechanical interface, such as in the first part 26 or in the second part 27, may in some examples provide that the decoupling is performed as close to the part of the electrically conducting element 28 extending into the tube element 16 as possible. In such case, the coupling may be efficiently reduced.

In FIG. 4*c*, the at least one decoupling element 19 is provided in the behind-the-ear module 9. Preferably, the at least one decoupling element is provided adjacent to the first part 26, or in close proximity to the first part 26, to ensure that the decoupling is provided as close to the part of the electrically conducting element extending into the tube element 16. The first part 26 of the electro-mechanical interface 25 forming part of the behind-the-ear module 9 and a second part 27 forming part of the tube element 16. In FIG. 4*c*, the first part 26 and the second part 27 are seen as being detached from each other, or disconnected.

In FIG. 4*d*, a hearing device having a plurality of electrically conducting elements comprising first sections 17', 17", 17" and second sections 21', 21", 21" is illustrated.

The second sections may connect to any electrical component in the behind-the-ear module 9, including but not limited to, the power source 8, the signal processor 12, the wireless communication unit 14, etc. The first sections 17', 17", 17" may via connection to the second sections 21', 21", 21" connect to for example, but not limited to, electrical components in the ear element 20, such as to transducers, such as to a receiver, one or more microphones, etc. In some embodiments, an electrically conducting element may not connect to any components in the ear element 20, however, it is envisaged that also such electrically conductive elements are decoupled at the first and optionally also the third frequency.

In FIG. 4*d*, the first part 26 and the second part 27 of the electro-mechanical interface 25 is shown as connected. In FIG. 4*d*, a second section 21' extends from the signal processor 12, through the first part 26 and to the second part 27. In the second part 27, the second section 21' connects to the decoupling element 19' for decoupling the first section 17' at the first frequency. The first section 17' extends from the decoupling element 19' into the tube element 16. A further second section 21" extends from anywhere in the behind-the-ear module, such as from the power source 8, the wireless communication unit 14, etc., and via the first part 25 to the decoupling element 19" being positioned in the first part 26. The first section 17" extends from the decoupling element 19", through the second part 27 and into the tube element 16. Thereby, the decoupling element 19" decouples the first section 17" from the second section 21" extending in the behind-the-ear module. A further second section 21'" extends from the signal processor 12 to the decoupling element 19'" being positioned in the behind-the-ear module 9. The first section 17" extends from the decoupling element 19" through the first part 26 and the second part 27 and extends into the tube element 16. The decoupling elements 19', 19", 19" are thus provided in series with the first sections 17', 17", 17" and the second sections 21', 21", 21".

It is envisaged that to obtain the best decoupling, each electrically conducting element extending into the tube element 16 should be decoupled using a decoupling element. Hereby, an efficient decoupling can be obtained between each of the at least one electrically conducting elements in the tube element 16 and the behind-the-ear module 9. As illustrated in the figures, the hearing device may comprise a plurality of electrically conducting elements 17', 17", 17", 21', 21", 21'" and a plurality of decoupling elements 19', 19", 19" configured to electrically decouple the plurality of electrically conducting elements from the behind-the-ear module at the first frequency. As is seen each of the plurality of electrically conducting elements is connected in series with one or more of the plurality of decoupling elements.

In one example, the electrically conducting element 17', 21' extending from the signal processor 12 connects the signal processor to the receiver 13 in the ear element 20. Thus, the electrically conducting element carries the audio signal from the signal processor 12 to the receiver 13. Such an audio signal is typically a low power signal at audible frequencies, and therefore, to ensure the best quality of the audio signal received by the receiver 13, the decoupling element 19' may be a decoupling element having a low impedance at the second frequencies, such as at the audible frequencies of the audio signal. The decoupling element may have an impedance which is lower than e.g. a decoupling element providing power to e.g. a microphone in the ear element 20. As the size of the decoupling element, such as the size of the inductor, is typically larger when the impedance should be minimized. By using only low impedance decoupling elements, for sensitive audio signals, the size of the hearing device can be minimized as other signals may be provided using decoupling elements having a higher impedance, and thus smaller physical size.

For example, at least a first electrically conducting element, such as 17', 21', and a second electrically conducting element, such as 17", 21", may be connected with a first decoupling element, such as 19', and a second decoupling element, such as 19", and the first decoupling element 19' may have lower impedance than the second decoupling element 19" at audible frequencies.

FIG. 5 shows a tube assembly 30 for a hearing device, the tube assembly 30 comprises an ear element 20 configured to be inserted into the ear of a user, a plug element 27 configured for attachment to a behind-the-ear module (not shown), a tube element 16 interconnecting the ear element 20 and the plug element 27, and an electrically conducting element 17 extending into the tube element. The plug element 20 comprises a decoupling element 19, the decoupling element 19 being provided in series with the electrically conducting element 17; the decoupling element being configured to decouple the electrically conducting element 17 from the behind-the-ear module at a first frequency when the plug element 27 is attached to the behind-the-ear module. It is envisaged that there may be a number of electrically conducting elements 17 extending into the tube element; typically, each electrically conducting element will have a decoupling element mounted in series therewith. The decoupling element may be an inductor with a self-resonant frequency at the first frequency.

FIG. 6 shows the impedance of a decoupling element according to an embodiment of the present disclosure. The 2.4 GHz ISM band is illustrated by line 33, extending in a range about the center frequency of 2.4 GHz. The impedance of two inductors are shown with lines 31 and 32. It is seen that both inductors have a self-resonance at about 2.4 GHZ, making such inductors efficient for decoupling at 2.4 GHz. It is envisaged that other inductors could be used for decoupling at e.g. a third frequency, so that the self resonant frequency would be selected at or at about the third frequency.

The person skilled in the art realizes that the claimed invention is not limited to the preferred embodiments described above. The person skilled in the art further realizes that modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A hearing device comprising:

a behind-the-ear module and a tube assembly, the tube assembly configured to releasably attach to the behind-the-ear module;

wherein the behind-the-ear module comprises:

a signal processor configured to process an audio signal and to provide an output signal to compensate for a hearing impairment of a user;

an antenna configured for electromagnetic radiation emission at a first frequency and/or electromagnetic radiation reception at the first frequency;

wherein the tube assembly comprises:

a tube element;

a wire in the tube element;

a decoupling element configured to electrically decouple the wire in the tube element and the behind-the-ear module at the first frequency, and to maintain an electrical connection between the wire and the behind-the-ear module at a second frequency that is different from the first frequency; and a connector fixedly coupled with the tube element, wherein the connector is configured to releasably attach (1) the tube element and (2) the wire in the tube element, physically to the behind-the-ear module;

wherein at least a part of the decoupling element is at the connector, and is away from the behind-the-ear module when the connector is detached from the behind-the-ear module, and wherein the at least the part of the decoupling element is detachable from the behind-the-ear module, and is away from the tube element while the connector is fixedly coupled with the tube element; and wherein the decoupling element comprises a primary decoupling element and a secondary decoupling element, the primary decoupling element and the secondary decoupling element being connected in series and having respective self-resonant frequencies.

2. The hearing device according to claim 1, wherein the connector has another wire, and wherein the decoupling element is between the wire and the other wire; and wherein the decoupling element is configured to electrically decouple the wire from the other wire at the first frequency, and to maintain an electrical connection between the wire and the other wire at the second frequency.

3. The hearing device according to claim 2, wherein the other wire extends at least partly in the behind-the-ear module.

4. The hearing device according to claim 1, wherein the decoupling element has an impedance above 1 kΩ at the first frequency.

5. The hearing device according to claim 1, wherein the primary decoupling element is comprises an inductor, and wherein the self-resonant frequency of the inductor is at the first frequency or at anywhere within a range defined by the first frequency +/−10% of the first frequency.

6. The hearing device according to claim 1, wherein the decoupling element is further configured to electrically decouple the behind-the-ear module at a third frequency, the third frequency being different from the first frequency and the second frequency.

7. The hearing device according to claim 1, further comprising an earpiece, the earpiece being configured to be inserted into an ear canal of the user, the tube element interconnecting the earpiece and the behind-the-ear module.

8. The hearing device according to claim 7, wherein the earpiece comprises a receiver, and wherein the signal processor is configured to provide the output signal to the receiver, and wherein the wire is connected to the receiver.

9. The hearing device according to claim 1, wherein the decoupling element has an impedance below 100Ω at the second frequency.

10. The hearing device according to claim 1, wherein the second frequency comprises an audible frequency.

11. The hearing device according to claim 1, further comprising an electrically conducting element and an additional decoupling element;

wherein the wire is connected with the decoupling element, and the electrically conducting element is connected with the additional decoupling element; and wherein the decoupling element and the additional decoupling element have different respective impedances.

12. The hearing device according to claim 1, further comprising a microphone in the behind-the-ear module.

13. The hearing device according to claim 1, wherein an entirety of the decoupling element is at the connector at the end of the tube element.

14. The hearing device according to claim 1, wherein another part of the decoupling element is at the behind-the-ear module.

15. A tube assembly for a hearing device, comprising:
- an ear element configured to be inserted into an ear of a user, the ear element comprising a microphone;
- a connector configured to releasably attach to a behind-the-ear module;
- a tube element interconnecting the ear element and the connector; and
- a wire in the tube element;
- wherein the connector comprises a decoupling element, and wherein the connector is fixedly coupled with the tube element;
- wherein the decoupling element of the connector is configured to decouple the wire in the tube element from the behind-the-ear module at a first frequency when the connector is attached to the behind-the-ear module, wherein the decoupling element of the connector is away from the behind-the-ear module when the connector is detached from the behind-the-ear module, and wherein the decoupling element is detachable from the behind-the-ear module, and is away from the tube element while the connector is fixedly coupled with the tube element; and
- wherein the decoupling element comprises a primary decoupling element and a secondary decoupling element, the primary decoupling element and the secondary decoupling element being connected in series and having respective self-resonant frequencies.

16. The tube assembly according to claim 15, where the primary decoupling element comprises an inductor, and wherein the self-resonant frequency of the inductor is at the first frequency or at anywhere within a range defined by the first frequency +/−10% of the first frequency.

17. The tube assembly according to claim 15, wherein the decoupling element is coupled in series with respect to the wire.

18. The tube assembly according to claim 15, wherein the connector and the tube element are formed as a unit that is separate from the behind-the-ear module.

19. The tube assembly of claim 15, wherein the wire comprises a receiver wire.

20. The tube assembly of claim 15, wherein the wire comprises a microphone wire.

21. The tube assembly of claim 15, further comprising another wire, wherein the decoupling element of the connector is coupled between the wire and the other wire.

22. The tube assembly of claim 21, wherein the decoupling element and the other wire are in the connector, and wherein a majority of the wire is in the tube element.

23. A hearing device comprising:
- a behind-the-ear module, a tube element extending from the behind-the-ear module, and an earpiece, the earpiece comprising a receiver;
- wherein the behind-the-ear module comprises a signal processor, the signal processor configured to process an audio signal and to provide an output signal to compensate for a hearing impairment of a user;
- a receiver wire connecting the receiver of the earpiece to the behind-the-ear module; and
- a decoupling element configured to electrically decouple a section of the receiver wire and the behind-the-ear module at a first frequency, and to electrically connect the section of the receiver wire and the behind-the-ear module at a second frequency that is different from the first frequency;
- wherein the hearing device further comprises a connector configured to releasably attach the tube element and the receiver wire from the behind-the-ear module, the connector being fixedly coupled with the tube element, wherein at least a part of the decoupling element is inside the connector, and wherein the at least the part of the decoupling element is detachable from the behind-the-ear module, and is away from the tube element while the connector is fixedly coupled with the tube element; and
- wherein the decoupling element comprises a primary decoupling element and a secondary decoupling element, the primary decoupling element and the secondary decoupling element being connected in series and having respective self-resonant frequencies.

24. The hearing device according to claim 23, further comprising a microphone wire, and an additional decoupling element configured to electrically decouple a section of the microphone wire and the behind-the-ear module at the first frequency.

25. The hearing device according to claim 24, wherein the additional decoupling element is configured to electrically connect the section of the microphone wire and the behind-the-ear module at the second frequency that is different from the first frequency.

26. A hearing device comprising:
- a behind-the-ear module, a tube element extending from the behind-the-ear module, and an earpiece, the earpiece comprising a receiver and a microphone;
- wherein the behind-the-ear module comprises a signal processor, the signal processor configured to process an audio signal and to provide an output signal to compensate for a hearing impairment of a user;
- a receiver wire connecting the receiver of the earpiece to the behind-the-ear module;
- a decoupling element configured to electrically decouple a section of the receiver wire and the behind-the-ear module at a first frequency, and to electrically connect the section of the receiver wire and the behind-the-ear module at multiple second frequencies that are different from the first frequency;
- wherein at least a part of the decoupling element is at a connector at an end of the tube element, the connector being fixedly coupled with the tube element, and wherein the at least the part of the decoupling element is detachable from the behind-the-ear module, and is away from the tube element while the connector is fixedly coupled with the tube element; and
- wherein the decoupling element comprises a primary decoupling element and a secondary decoupling element, the primary decoupling element and the secondary decoupling element being connected in series and having respective self-resonant frequencies.

27. The hearing device according to claim 26, wherein another part of the decoupling element is at the behind-the-ear module.

28. The hearing device according to claim 26, wherein the at least a part of the decoupling element is located away from electronics inside the behind-the-ear module.

* * * * *